Sept. 25, 1951      D. L. JERMAN      2,569,316
DIFFERENTIAL PRESSURE CLOSED SAFETY VALVE
Filed Sept. 27, 1948
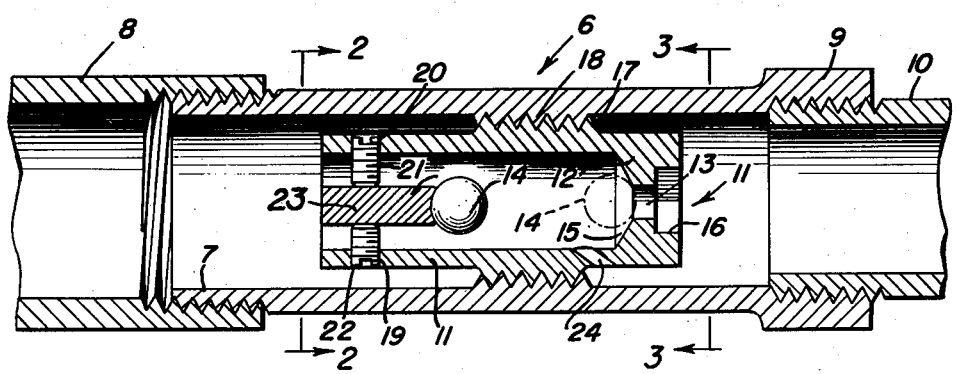
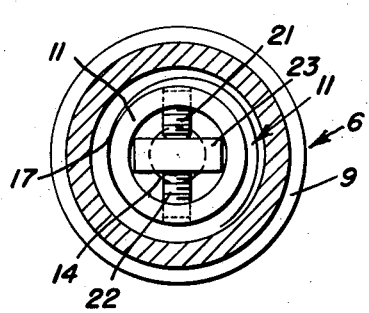
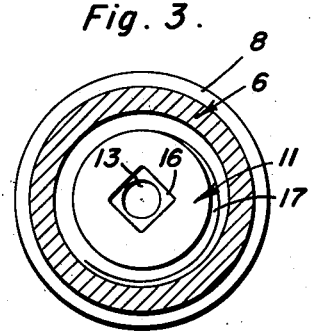
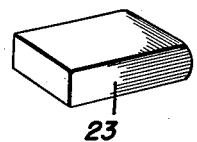
Daniel L. Jerman
INVENTOR.
BY
Attorneys Patented Sept. 25, 1951

2,569,316

UNITED STATES PATENT OFFICE 2,569,316

DIFFERENTIAL PRESSURE CLOSED SAFETY VALVE

Daniel L. Jerman, Teaneck, N. J.

Application September 27, 1948, Serial No. 51,368

4 Claims. (Cl. 137—139)

1

The present invention relates to certain new and useful improvements in safety-type ball check and equivalent valves and has reference in particular to one which is, it is submitted, aptly and efficiently constructed and designed to prevent excess flow of air, gas or liquids in a line in which said valve is installed, excess discharge of such fluids from the line into the atmosphere, or excess flow between pressure vessels, receivers, tanks or holders or any combination of the foregoing adaptations and arrangements but to allow normal flows.

More specifically, and as will be later noted, this invention is adapted to the prevention of explosions due to the uncontrolled escape of gas from high pressure gas lines.

One object of the invention is to provide an abnormal flow control and check valve which may be embodied in a pipe line fitting for incorporation in a pipe or equivalent line.

Another object of the invention is to provide a valve which will effectively and reliably prevent uncontrolled discharge of fluid under abnormal or dangerously high pressure, which may be relied upon to guard the users of gases and liquids under pressure or head against excess discharge should pipes or controlling mechanisms be ruptured or disassembled while subjected to the dangers attending high pressures, but still permits passage of normal flows of gas through the line.

More specifically, novelty is predicated upon an excess flow controlling valve which is characterized by a hollow body having a ported valve seat, a differential pressure responsive magnetizable ball check valve operable in the body and releasably contactable with a magnet and cooperable with said seat in a manner to close the port when a given degree of fluid differential pressure is exceeded, there being a magnetic source in said body so that when the fluid differential head is normal, that is as to degree of differential pressure, said steel ball valve is unseated and held open by the magnetic forces, in separably connectable relation with said magnetic source, and which does not depend on the force of gravity for success nor does it use springs or diaphragms for effective action.

Other objects and advantages will become more readily apparent from the following description and the accompanying illustrative drawings.

In the drawings:

Figure 1 is a view in section and elevation of a safety-type valve constructed in accordance with the principles of the present invention.

2

Figure 2 is a cross section on the line 2—2 of Figure 1, looking in the direction of the arrows.

Figure 3 is a cross section on the line 3—3 of Figure 1, looking in the direction of the arrows.

Figure 4 is a perspective view of the preferred type of magnet which I use.

Briefly summarized and by way of introduction to the detailed description it will be seen that the invention has to do with a fitting which is incorporated in a fluid line and which has removably mounted therein a novel valve construction. The latter comprises an elongated tubular body which is wholly open at its intake end and is provided at its opposite discharge end with a centrally apertured diaphragm. The diaphragm provides a valve seat and the aperture therein provides the gas delivering port. A permanent magnet is removably mounted in the intake end and is opposed to the valve seat and, in fact, is spaced therefrom. The bore of the valve body between the seat and inner end of the magnet is completely free of mechanical obstructions. It is in this space that a steel or equivalent metal ball is freely operable. Normally the ball is engaged with the magnet as shown and thus the valve is, at this time, "open." When a predetermined degree of force of differential pressure is exerted across the ball valve, that is, assuming that the latter is retained on the magnet, and the force exceeds the retentive properties of the permanent magnet, the ball is released and promptly snaps to closed position against the valve seat as shown in dotted lines. It may be said too, that the closing point in a valve of this construction is selectively controllable and this is accomplished by varying the internal diameter of the bore of the valve body, or the diameter of the ball, or the force of the magnet in an obvious manner.

Referring now to the drawings by distinguishing reference numerals, the fitting is denoted by the numeral 6 and has a screw-threaded end portion 7 at the left end which is screwed into the screw threads of an associated pipe 8 constituting a part of a gas, air or liquid circulating line. The opposite end of the fitting is provided with an internally screw-threaded collar 9 which is screwed onto the screw-threaded end of a second pipe section 10 in the stated line. The improved valve, as a unit, is denoted by the numeral 11 and comprises a tubular or hollow valve body 11 having a diaphragm 12 at one end which diaphragm is centrally apertured as at 13 to provide a centrally ported valve seat to accommodate the steel ball check valve 14.

The orifice 13 is of a diameter less than the external diameter of the steel ball check valve. The opposite side of the diaphragm is fashioned with a recess 16 defining an accommodation for a wrench or equivalent tool (not shown). Intermediate its ends, the valve body is provided with a screw-threaded portion or adapter 17 whereby said body may be connected with the co-acting internal threads 18 provided in the fitting, pipe, or vessel. The opposite or left hand end portion of the body 11 has diametrically opposite screw-threaded holes 19 and 20 to accommodate set screws 21 and 22 which set screws are arranged to contact and hold the permanent magnet 23 in place in the manner shown. The magnet is of any suitable cross section and size to fit properly into the bore of the valve body as shown in Figure 2. The set screws combine with the magnet in allowing the free entry of fluid (air, gas or liquid) at the intake end of said body. It is obvious that the valve is made to established proportions to accommodate the free and unrestricted passage of a predetermined amount of fluid. When, however, the differential pressure head of the fluid reaches what is determined to be an abnormal or excess degree the steel ball check valve 14, which is normally unseated held in intimate contact with and by said magnet 23, comes automatically into play and moves in the flow stream to the closed dotted line position shown in Figure 1. Or to state the matter otherwise, the magnetic forces play on the steel ball and hold the ball in releasable contact with the magnet as shown at the left in Figure 1. When the differential pressure becomes excessive it acts on the ball to disengage it from the magnet and plunge said valve against the valve seat where it rides into the opening and which it closes in an obvious manner.

Ball check valves for controlling abnormal pressure conditions are of course not new. The adoption and use of a valved body with a conical valve seat for piloting the valve into the port to close same, and a magnet for normally unseating and keeping the valve open in any position would appear to be novel in this line of endeavor.

It will be clear to the reader that once the ball check valve is closed, as shown in dotted lines in Figure 1, it stays closed until the differential created across the diaphragm 12 is either eliminated or reversed upon which the ball is returned to the magnet. Reference being had again to Figure 1 it will be seen that the numeral 24 denotes a diagonal passage or port which constitutes a suitable by-pass. I desire it understood that the by-pass may be included to maintain a minimum flow, if desired.

It will be obvious that a magnet held ball check is advantageous and, in fact, superior to spring types in that it is a predetermined accurate force and does not increase in resistance to flow as the ball travels towards its seat, as would be the case with a spring arrangement. Then too, springs gum up, fatigue and break and would require a guide device to retain alignment of travel of the ball toward the seat in the closing step.

A gravity operated device would not be as flexible of use as the permanent magnet device which is workable in either vertical or horizontal planes and the position is not critical and only effects point of closure slightly. My magnetic device has only one moving part, no latches, cams, guides or pressure responsive diaphragms which require frequent servicing, which wear out and have to be renewed. Nor does the structure interfere with cleaning by washing through in a reverse direction. It is possible that two bodies 11 installed in opposition in the same pipe or fitting will prevent excess flow in either direction.

It is clear, no doubt, that the steel ball check is held open by magnetic force which must be overcome by the differential pressure caused by flow in excess of that normally to be passed. The static or line pressure itself has no material effect on the mechanism except as to be present to cause flow to the point of least pressure. Static pressure may rise and fall without closing the valve, provided the rate of flow does not increase. Manifestly, too, the ball valve when closed and the closing pressure is relieved will be drawn off of the seat and against the permanent magnet with rapid snap action. All of these factors contribute their proportionate shares to the provision of a highly practical and suitable safety valve construction.

It will be noted from the foregoing description taken in connection with the accompanying drawing, that I have provided a differential pressure closed safety valve which can be installed in any suitable type of line conducting fluids of any nature. In accordance with my invention I provide a magnetic member which is disposed in the line of flow of a fluid in a conduit which magnet readily sustains a magnetized or permanently magnetic member which is subject to various pressures and which upon the flow of a fluid at a pressure higher than normal for that particular fluid is moved from the magnet and forced by the fluid in the direction of the flow of said fluid into a seat so as to close up said valve and prevent further flow of the fluid through the line.

Changes in shape, size, materials and rearrangement of details and parts may be resorted to in actual practice, so long as they do not depart from the spirit of the invention or the scope of the appended claims, as is well understood.

Having described the invention, what is claimed as new is:

1. A normal flowpassing and excessive differential pressure cut-off valve adapted to be incorporated in a fluid line to stop the flow of fluid through the line when the degree of differential pressure rises to an abnormal stage comprising, a hollow valve body embodying a fluid passage and provided at one end with a valve seat having a fluid discharge port, a permanent magnet mounted in the passage of said body at the remaining end of the body and longitudinally spaced from said valve seat, the passage between said seat and magnet being free of mechanical obstructions, and a differential pressure-responsive metallic ball valve operable in the passage in said body and releasably contactable with the discharge port in a manner to close the latter when the degree of differential pressure of the fluid in said passage exceeds a predetermined stage, said ball valve being normally retained in magnetic engagement with said magnet so as not to interfere with the normal flow of fluid through the passage and out by way of the discharge port but to permit excessive differential pressure, coming across said ball, to dislodge the ball from the magnet and to forcibly drive and snap it against said seat and to close the discharge port.

2. A normally "open" automatically closing valve device adapted to be installed in a high pressure gas service line to automatically shut off the passage of gas, comprising a valve body having an axial gas passage, a valve seat at one of said passage provided with a gas port, a permanent magnet removably mounted in the remaining end of said passage, said magnet being of a cross-section less than the cross-section of the passage with its peripheral surfaces spaced from surrounding surfaces of the passage and defining an intake orifice for delivering a supply of gas to said passage, and a steel ball check valve located in said passage and concentrically attached, by magnetic forces, to said magnet, the space of said passage between said seat and ball valve being free of obstructions and said ball being freely movable without hindrance from said seat to said magnet and vice versa, said ball check valve being of a diameter greater than the cross-section of the magnet so that surfaces of the valve, projecting beyond coacting surfaces of the magnet, will cause excessive incoming gas pressure to act against the valve, dislodge it from the magnet and drive it against the seat to close the port in the seat.

3. A normally "open" self-closing safety-type check valve for stopping the flow of gas through said valve when the differential pressure head exceeds a normal stage, comprising a hollow body having a valve seat embodying a gas delivery port, a gas differential pressure-responsive valve operable in said body and contactable with said seat in a manner to close the port in the seat when a given degree of gas differential pressure across said valve is exceeded, a permanent magnet mounted in said body and spaced from said seat, whereby when the fluid head is normal, as to differential pressure, said valve is held "open" by, and maintained in retentive engagement with said magnet, and a pipe line fitting adapted to be incorporated in a pipe line and embodying a pipe section having means for connection with coacting pipe sections in the line and internally screw-threaded, said valve body having external screw threads screwed into the internal threads in said fitting, whereby said fitting and safety closing valve combine into a ready-to-install assembly.

4. A normally open flow closing safety-type check valve comprising an open ended tubular fitting adapted to be incorporated in a pipe line and embodying a pipe section having means at opposite ends for coaction with pipe sections in the stated line, and a valve construction fitting removably in said pipe section, said valve construction comprising an elongated tubular body having a centrally apertured diaphragm at one end providing a valve seat, said diaphragm having an external recess and said recess constituting a tool grip, a permanent magnet fitting telescopically and concentrically into an opposite end portion of said tubular body and having its outer end flush with the corresponding end of said body and its inner end spaced from said valve seat, the space existing between the valve seat and the inner end of said magnet being free of obstructions, set screws mounted on said tubular body and releasably engaging and removably holding a permanent magnet in the body, portions of said magnet being spaced from surrounding portions of the body and providing a gas inlet between the body and magnet, and a steel ball check valve in engagement with and held by said magnet in an open position.

DANIEL L. JERMAN.

REFERENCES CITED

The following references are of record in the file of this patent:

UNITED STATES PATENTS

| Number | Name | Date |
|---|---|---|
| 869,878 | Bruckner | Nov. 5, 1907 |
| 1,097,143 | Singleton | May 19, 1914 |
| 1,319,787 | Moran | Oct. 28, 1919 |
| 1,788,358 | Goerg | Jan. 6, 1931 |
| 1,910,012 | Halsey | May 23, 1933 |
| 1,934,548 | Kellogg | Nov. 7, 1933 |

FOREIGN PATENTS

| Number | Country | Date |
|---|---|---|
| 74,521 | Austria | Aug. 26, 1918 |
| 551,386 | Great Britain | Feb. 19, 1943 |